Aug. 4, 1964　　　L. C. GALORNEAU ETAL　　　3,143,177
TOOL HOLDER
Filed Jan. 23, 1961　　　　　　　　　　　2 Sheets-Sheet 2
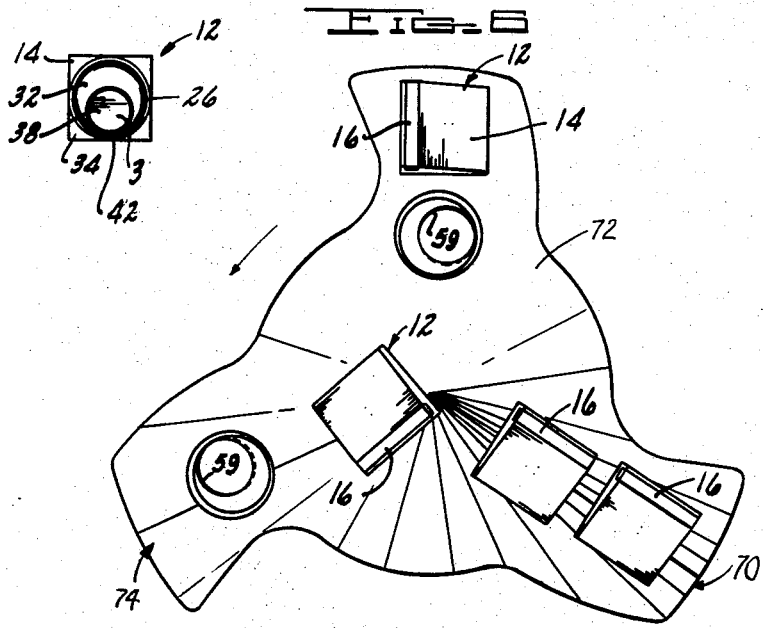
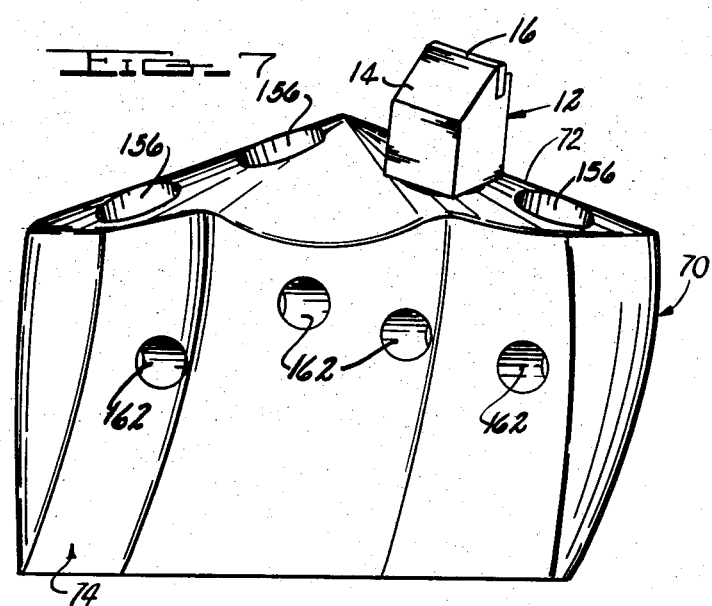
INVENTOR.
LOUIS C. GALORNEAU
JOHN G. FOWLER
BY
WILSON, SETTLE, M<sup>c</sup>RAE & CRAIG
ATTORNEYS United States Patent Office 3,143,177
Patented Aug. 4, 1964

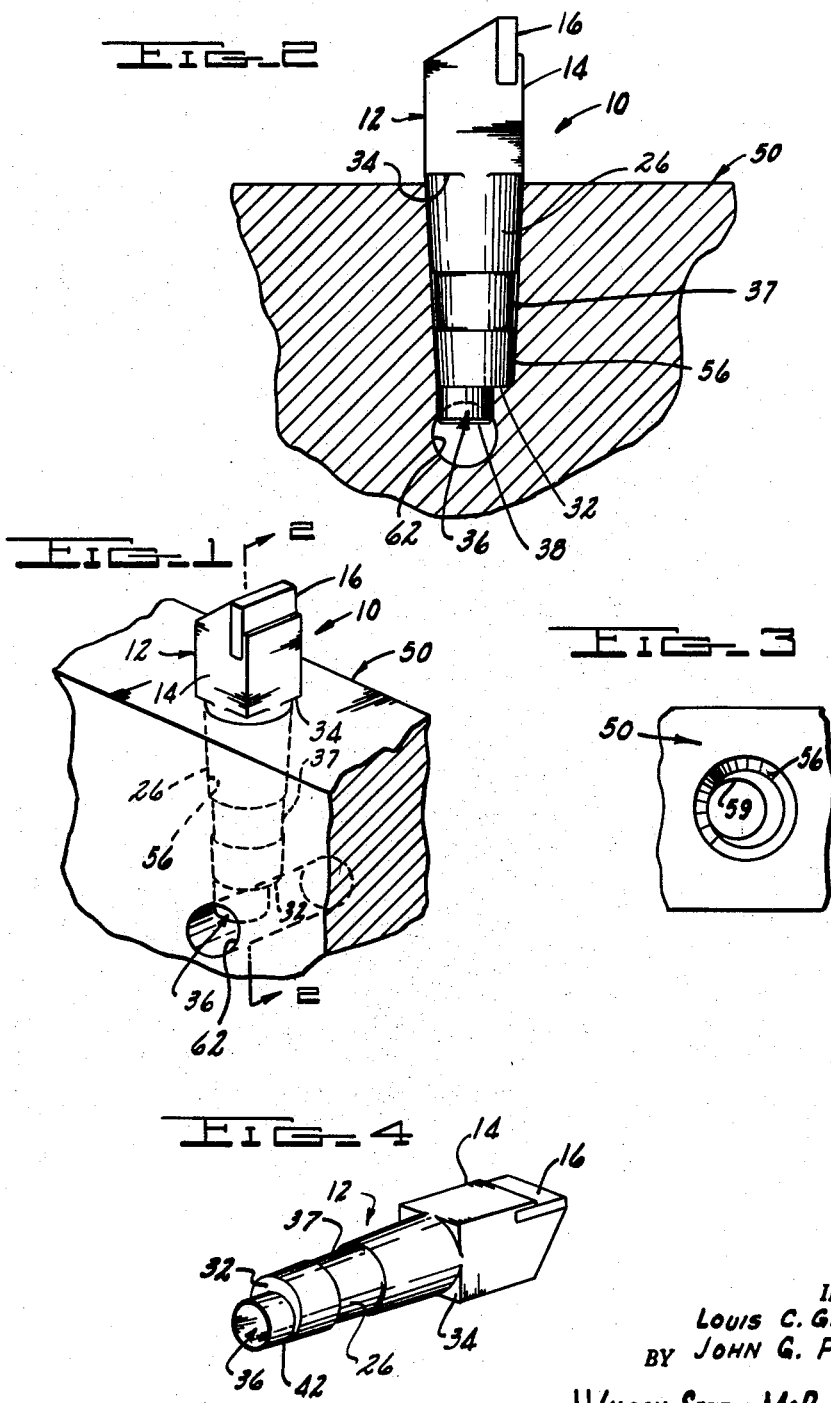

3,143,177
TOOL HOLDER
Louis C. Galorneau, 931 S. Gulley, and John G. Fowler, 24934 Winona, both of Dearborn, Mich.
Filed Jan. 23, 1961, Ser. No. 84,161
3 Claims. (Cl. 175—413)

The present invention relates to new and useful improvements in tool holders and particularly to a holder of the type used for locating and positioning a plurality of tool bits in a rotating earth boring mining drill or similar cutting device.

The tool holder and tool bit of the present invention is adapted to permit quick and easy installation of tool bits as well as rapid removal of the tool bits therefrom as to facilitate the replacement of broken or dull tool bits, which heretofore have caused a serious problem.

It is therefore a primary object of the present invention to provide a rotary or stationary tool bit and tool holder which is simple, durable and relatively inexpensive, by comparison with other known earth boring devices.

It is a further object of the invention to provide a tool holder wherein tool bits can be readily and accurately positioned into a predetermined location.

Still another object of the instant invention is the provision of a tool holder wherein positioning of the tool bit is positive and accomplished without the necessity of providing flanged shoulders on the outer surface of the tool holder proper.

These and other objects can be accomplished by the provision of a tool holder having a generally cylindrically shaped body member; a plurality of spaced axial lobes on said cylindrical body member; a conical surface on one end of said cylindrical lobed member; said lobes in the form of a spiral convolution and located at substantially right angles to the face of the conical end sections thereof; a plurality of tapered openings in each of said lobes, each tapered opening adapted to receive and position a tapered shank tool bit; a cylindrical pre-located opening on the end of said tapered shank portion and eccentrically positioned with respect thereto; said cylindrical shank portion of said tool bit adapted to have a cylindrical finger extending therefrom so as to prevent rotation thereof when said finger is engaged in said pre-located opening; and knock-out means adjacent the end of each of said tool bits which extend through the lobes at substantially right angles thereto so as to permit quick and easy removal of the tool bits.

Other objects of this invention will appear in the following description and appended claims, reference being had to the accompanying drawings forming a part of this specification wherein like reference characters designate corresponding parts in the several views.

In the drawings:

FIGURE 1 illustrates a perspective view of a tool holder and tool bit assembly which embodies the present invention.

FIGURE 2 illustrates a cross sectional view taken along lines 2—2 of FIGURE 1 with the tool bit being shown in elevation for clarity.

FIGURE 3 shows a plan view of a fragmentary section of the tool holder with the tool bit removed.

FIGURE 4 illustrates the tool bit of the present invention.

FIGURE 5 is an end view of the tool bit shown in FIGURE 4.

FIGURE 6 shows the tool holding means illustrated in the foregoing drawings applied to a rotary drill body, wherein a plurality of tool bits are used in a single tool holder, some tool bits of which are shown positioned, while others have been removed to better illustrate the invention.

FIGURE 7 is an elevational view of FIGURE 6.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, FIGURE 1 illustrates a tool holder 50 and tool bit assembly 10, which embodies the present invention. The tool bit 12 (FIGURES 4 and 5) has a generally rectangular head portion 14 on one end thereof, while the other end has a tapered shank portion 26. A carbide cutter 16 is cemented to one face of the tool bit 12, using a prescribed, standard method which forms no part of the present invention. However, without the use of this carbide type cutter 16, the utility and life expectancy of the resulting tool bit 12 would be substantially reduced.

The present invention is found in the rearmost portion of the tapered shank section 26. The body portion of the shank 26 is uniformly tapered from the base 34 of the head portion 14 to a flat surface 32 which is generally parallel thereto. An undercut section 37 is provided intermediate the parallel surfaces 32 and 34 so as to reduce the frictional contact area of the tapered shank portion 26 with respect to its mating surface 56 in the tool holder 50. This construction assures quick and easy removal of the tool bit 12 when it becomes dull or broken through usage. In addition, high quality parts can be produced, while a relaxation of the tolerances can be effected, thereby lowering the ultimate final cost to the consumer.

Extending outwardly from the flat surface 32 on the end of the tapered shank 26, is a cylindrical finger member 36. The finger member 36 is eccentrically located in generally parallel spaced relationship to the rotational axis of the tapered shank 26 and in predetermined tangential relationship with respect to the lower edge surface 42 thereof. The end 38 of the cylindrical member 36 is substantially parallel to the above described flat surfaces 32 and 34.

Referring now to FIGURES 2 and 3 of the drawings which illustrate the tool holder 50 of the present invention, it will be apparent that a similarly shaped tapered opening 56 in the body of the tool holder is provided to receive the tool bit 12. The tapered opening 56 provided in the body of the tool holder 50 is adapted to receive the tapered shank portion 26 of the tool bit 12. At the base of the tapered portion, a cylindrical opening 59 is provided which is eccentrically positioned with respect to the tapered section. The cylindrical opening 59 being displaced a predetermined amount in accordance with the spaced relationship of the rotational axis of the cylindrical portion 38 and tapered section 26. The cylindrical opening 59 is of course located in predetermined relationship with respect to the cutting edge 16 of said tool bit so that the cutting edge thereof will be properly positioned for maximum efficiency of the cutting surface.

Extending substantially at right angles to the body of the tool holder is an opening 62 which extends therethrough. Opening 62 is positioned in a manner to intersect opening 59 and expose the bottom portion 36 of the tool bit 12 while providing adequate space to receive a tapered drift or similar object (not shown). The drift is inserted into the opening 62 until it reaches the cylindrical end 38 of the tapered body portion 26 of the tool bit 12, whereupon the drift is struck sharply with a hammer or other heavy object to release the bit from the holder. This is a simple operation and can be accomplished by a non-skilled worker.

The embodiment of the invention shown in FIGURES 6 and 7 of the drawings, illustrate an auger type earth boring drill 70. This type drill is used in mining where skilled help and tools are in very short supply. Therefore application of the above teachings lend handsomely to the solution of a serious problem.

The rotary drill 70 illustrated in the above mentioned figures is of generally cylindrical configuration with a conical end portion 72 on one end thereof. Additionally, a plurality of spaced axial lobes 74 are provided in the form of a spiral. A plurality of tapered openings 156, which openings are located in spaced relationship to the axis of rotation so as to substantially form a spiral convolution. By this means each of the openings 156 is positioned so as to remove a predetermined portion of the drilled opening being formed. As in the first instance, a plurality of knock-out openings 162 are located at substantially right angles to the spiral lobes 74 and adjacent the ends of the tapered portion 156 of the tool bit receiving opening. When the tool bits 12 are properly positioned, the ends 38 thereof will extend into the opening 159 and can be removed by the same manner previously described. This provides a means for quick and easy removal of the tool bits 12, while the cylindrical finger portion 36 assures proper location and relationship of the cutting edges with respect to the axis of rotation.

The present invention is simple, durable and positive in action. It can be manufactured using modern mass production methods and is within the economic reach of all individuals and corporations who require such earth boring equipment.

Having thus described our invention, we claim:

1. In a tool bit for use with a tool holder, the combination of,
    a tool bit, the outer end of said tool bit having at least one cutting surface thereon, the inner end having a tapered shank;
    a cylindrical drive member integral with said tapered shank, said cylindrical drive member being of lesser diameter than said tapered shank, one edge of said cylindrical drive member located in tangential relationship to the lowermost edge of said tapered shank;
    said cylindrical drive member depending from the bottom surface of said tapered shank, the axis of said drive member off-set in spaced relationship to the rotational axis of said tapered shank so as to accurately establish a pre-determined relationship between said cutting surface and the tool holder in which said tool bit is used.

2. In a rotatable drill head for use in the mining industry, the combination of,
    a drill head body member;
    a plurality of spaced lobes on said drill head body member, said spaced lobes in the form of a spiral;
    a substantially smooth surface on one end of said drill head body member, said smooth surface generally conical in configuration;
    at least one opening in each of said lobes, said openings depending inward from said smooth conical surface at a predetermined angle;
    each of said openings in the conical surface cooperable to receive and accurately position a removable tool bit;
    each of said openings tapered from top to bottom, with a cylindrical opening at the base, one edge of which is in substantial tangential relationship to the bottom edge of each of said tapered openings and depends downwardly therefrom and is cooperable to receive the cylindrical portion of a tool bit, while the tapered portion of the opening receives the tapered shank portion of the tool bit, the axes of said tapered openings and the axis of said cylindrical portion being offset in eccentric relationship;
    and means in each of the lobes to permit the quick and easy removal of each of the tool bits.

3. In a tool bit for use in connection with a tool holder, the combination of,
    a tool bit;
    an enlarged portion on the outer end thereof, said enlarged portion of generally rectangular configuration with at least one cutting edge thereon, the inner end of said tool bit having a tapered shank portion depending from said rectangular portion;
    an eccentric cylindrical finger of lesser diameter than the least diameter of said tapered shank depending from the end of said tapered shank, which cylindrical finger is off-set from the rotational axis of said tapered shank in pre-determined spaced relationship to form a driving means for said tool bit and a locator for said cutting edge;
    said eccentric cylindrical finger cooperable with a similar eccentric cylindrical opening in the bottom of each tapered opening in said tool holder, engagement of said eccentric cylindrical finger with said corresponding opening in said tool holder acting to prevent rotation of said tool bit, thereby providing a positive drive means.

References Cited in the file of this patent

UNITED STATES PATENTS

| | | |
|---|---|---|
| 884,150 | Hardsocg | Apr. 7, 1908 |
| 1,264,370 | Copeman | Apr. 30, 1918 |
| 2,042,114 | McCallum | May 26, 1936 |
| 2,701,126 | McClennan | Feb. 1, 1955 |
| 2,705,128 | McClennan | Mar. 29, 1955 |
| 2,780,439 | Kandle | Feb. 5, 1957 |
| 2,800,302 | McClennan | July 23, 1957 |
| 2,955,810 | McWhorter et al. | Oct. 11, 1960 |
| 2,989,295 | Prox | June 20, 1961 |